United States Patent
Shargots et al.

(10) Patent No.: US 12,293,846 B2
(45) Date of Patent: May 6, 2025

(54) CONTROL ROD REMOTE DISCONNECT MECHANISM

(71) Applicant: BWXT Advanced Technologies LLC, Lynchburg, VA (US)

(72) Inventors: Scott J. Shargots, Forest, VA (US); Ryan Z. Ziegler, Forest, VA (US); Jason C. Brown, Lynchburg, VA (US); David K. Haslet, Lynchburg, VA (US); Emily D. Fleming, Forest, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 397 days.

(21) Appl. No.: 17/977,748

(22) Filed: Oct. 31, 2022

(65) Prior Publication Data

US 2023/0137322 A1    May 4, 2023

Related U.S. Application Data

(60) Provisional application No. 63/273,687, filed on Oct. 29, 2021.

(51) Int. Cl.
*G21C 7/12* (2006.01)
*G21C 7/117* (2006.01)

(52) U.S. Cl.
CPC ............... *G21C 7/12* (2013.01); *G21C 7/117* (2013.01)

(58) Field of Classification Search
CPC ................................ G21C 7/117; G21C 19/11
USPC ......................................................... 376/233
See application file for complete search history.

(56) References Cited

U.S. PATENT DOCUMENTS

| | | | |
|---|---|---|---|
| 3,046,906 A | 7/1962 | Budzich | |
| 3,720,580 A * | 3/1973 | Schabert | G21C 7/12 |
| | | | 376/233 |
| 3,741,867 A | 6/1973 | Fortescue | |
| 3,822,439 A | 7/1974 | Wallin et al. | |
| 4,147,589 A | 4/1979 | Roman et al. | |
| 4,646,414 A | 3/1987 | Wilson et al. | |
| 4,752,434 A * | 6/1988 | Savary | G21C 19/105 |
| | | | 376/233 |
| 4,778,645 A | 10/1988 | Altman et al. | |

(Continued)

FOREIGN PATENT DOCUMENTS

| | | |
|---|---|---|
| CN | 112071446 A | 12/2020 |
| GB | 874222 A | 8/1961 |
| WO | 2023076676 A1 | 5/2023 |

OTHER PUBLICATIONS

International Search Report and Written Opinion, PCT/US2022/48421, dated Jan. 31, 2023, 7 pages.

(Continued)

*Primary Examiner* — Sharon M Davis
(74) *Attorney, Agent, or Firm* — Nelson Mullins Riley & Scarborough LLP (57) ABSTRACT

A control rod drive mechanism having a torque tube, a control rod assembly including a connecting rod and a spider, a lock cam assembly rotatably secured to a bottom end of the connecting rod and including a locking cam, and a locking collar disposed non-rotatably within the spider, the locking collar including a locking recess with an entry slot, wherein in a first axial position the lock cam assembly is rotatable with respect to the torque tube, and a second axial position the lock cam assembly is non-rotatable with respect to the torque tube.

9 Claims, 8 Drawing Sheets

(56) References Cited

U.S. PATENT DOCUMENTS

| | | | |
|---|---|---|---|
| 5,141,711 | A | 8/1992 | Gjertsen et al. |
| 5,513,229 | A | 4/1996 | Willems |
| 5,761,260 | A | 6/1998 | Bergamaschi |
| 8,483,346 | B2 | 7/2013 | McCarty et al. |
| 8,526,563 | B2 | 9/2013 | Shargots et al. |
| 9,025,720 | B2 | 5/2015 | Tylman |
| 10,096,388 | B2 | 10/2018 | Shargots |
| 10,102,933 | B2 | 10/2018 | Walton et al. |
| 10,600,518 | B2 | 3/2020 | Shargots et al. |
| 2011/0222640 | A1 | 9/2011 | DeSantis |
| 2012/0051482 | A1* | 3/2012 | Shargots ............... G21C 7/117 376/219 |
| 2013/0272464 | A1 | 10/2013 | Walton et al. |
| 2023/0137322 | A1 | 5/2023 | Shargots et al. |

OTHER PUBLICATIONS

International Search Report and Written Opinion, PCT/US2022/48446, dated Feb. 9, 2023, 7 pages.

U.S. Appl. No. 17/977,789, filed Oct. 31, 2022, Scott J. Shargots.

\* cited by examiner

CONTROL ROD REMOTE DISCONNECT MECHANISM

CLAIM OF PRIORITY

This application claims priority to U.S. provisional patent application No. 63/273,687 filed Oct. 29, 2021, the disclosure of which is incorporated by reference herein.

TECHNICAL FIELD

The presently disclosed invention relates generally to systems and methods of use thereof for controlling reactor power levels in nuclear reactors and, more specifically, to systems and methods of use thereof for controlling the operation of control rods for nuclear thermal reactors.

BACKGROUND

In thermal nuclear power plants, a nuclear reactor core comprises a fissile material having size and composition selected to support a desired nuclear fission chain reaction. The core is disposed in a pressure vessel immersed in primary coolant water. It is further known to control or stop the reaction by inserting "control rods" comprising a neutron-absorbing material into guide tubes passing through the reactor core. When inserted, the control rods absorb neutrons so as to slow or stop the chain reaction.

The control rods are operated by control rod drive mechanisms (CRDMs). With "regulating" control rods, the insertion of the control rods is continuously adjustable so as to provide continuously adjustable reaction rate control. For "shutdown" control rods, the insertion is either fully in or fully out. During normal operation the shutdown rods are fully retracted from the reactor core, whereas during a SCRAM, the shutdown rods are fully inserted so as to rapidly stop the chain reaction. Control rods can also be designed to perform both regulating and shutdown rod functions. In some such dual function control rods, the control rod is configured to be detachable from the CRDM in the event of a SCRAM, such that the detached control rod falls into the reactor core under the influence of gravity. In some systems, such as naval systems, a hydraulic pressure or other positive force (other than gravity) is also provided to drive the detached control rods into the core.

To complete the control system, a control rod/CRDM coupling is provided. A known coupling includes a connecting rod having a lower end at which a spider is secured. The upper portion of the connecting rod operatively connects with the CRDM. In regulating rods, this connection includes a lead screw or other incremental adjustment element. Conventionally, the lead screw scrams with the connecting rod, spider, and control rods as a translating assembly (also known as the "control rod assembly"). In some known approaches, however, the lead screw may be retained in the CRDM and the remainder of the control rod assembly scrams. To reduce cost and overall system complexity, a single CRDM is typically connected with a plurality of control rods via a spider. In this arrangement, all the control rods coupled with a single spider together as a translating control rod assembly (CRA). In practice a number of CRDM units are provided, each of which is coupled with a plurality of control rods via a spider, so as to provide some redundancy. The spider extends laterally away from the lower end of the connecting rod to provide attachment points for multiple control rods.

During certain operations, for example, extended shutdown for maintenance, etc., it may be required that the translating control rods of the CRAs be fully inserted into the reactor core for extended periods of time. As such, it is desirable to have the ability to remotely engage and disengage the translating control rods from the CRDMs at a fixed location, such as between the connecting rods and the spiders, by vertical motion of the connecting rods.

SUMMARY OF INVENTION

One embodiment of the present disclosure provides a control rod drive mechanism having a torque tube with an inner surface defining a central bore, a control rod assembly including a connecting rod disposed within the central bore of the torque tube and a spider, the connecting rod being releasably securable to the spider, a lock cam assembly rotatably secured to a bottom end of the connecting rod, the lock cam assembly including a body portion and at least one locking cam extending radially-outwardly therefrom, and a locking collar disposed non-rotatably within the spider, the locking collar including an inner surface defining a central bore and at least one locking recess therein, the locking recess including an entry slot extending downwardly from a top edge of the locking collar, wherein the connecting rod is axially-movable with respect to the torque tube between a first position in which the lock cam assembly is rotatable with respect to the torque tube, and a second position in which the lock cam assembly is non-rotatable with respect to the torque tube.

Another embodiment of the present disclosure provides a disconnect mechanism for use with a control rod drive mechanism having a torque tube, including a connecting rod that is non-rotatably disposed within the torque tube, a lock cam assembly rotatably secured to a bottom end of the connecting rod, the lock cam assembly including a body portion and at least one locking cam extending radially-outwardly therefrom, and a locking collar disposed non-rotatably within the torque tube, the locking collar including an inner surface defining a central bore and at least one locking recess therein, the locking recess including an entry slot extending downwardly from a top edge of the locking collar, wherein the connecting rod is axially-movable with respect to the control rod drive mechanism between a first position in which the lock cam assembly is rotatable with respect to the connecting rod, and a second position in which the lock cam assembly is non-rotatable with respect to the connecting rod.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements.

Repeat use of reference characters in the present specification and drawings is intended to represent same or analogous features or elements of the invention according to the disclosure.

DESCRIPTION OF THE PREFERRED EMBODIMENTS

Reference will now be made to presently preferred embodiments of the invention, one or more examples of which are illustrated in the accompanying drawings. Each example is provided by way of explanation, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of the control rod assembly with a remote disconnect mechanism, such as but not limited to "vertical," "horizontal," "upper," "lower," "above," or "below," refer to directions and relative positions with respect to the disconnect mechanism's orientation in its normal intended operation, as indicated in the Figures herein. Thus, for instance, the terms "vertical" and "upper" refer to the vertical direction and relative upper position in the perspectives of the Figures and should be understood in that context, even with respect to a reactor that may be disposed in a different orientation.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

Figure 1:
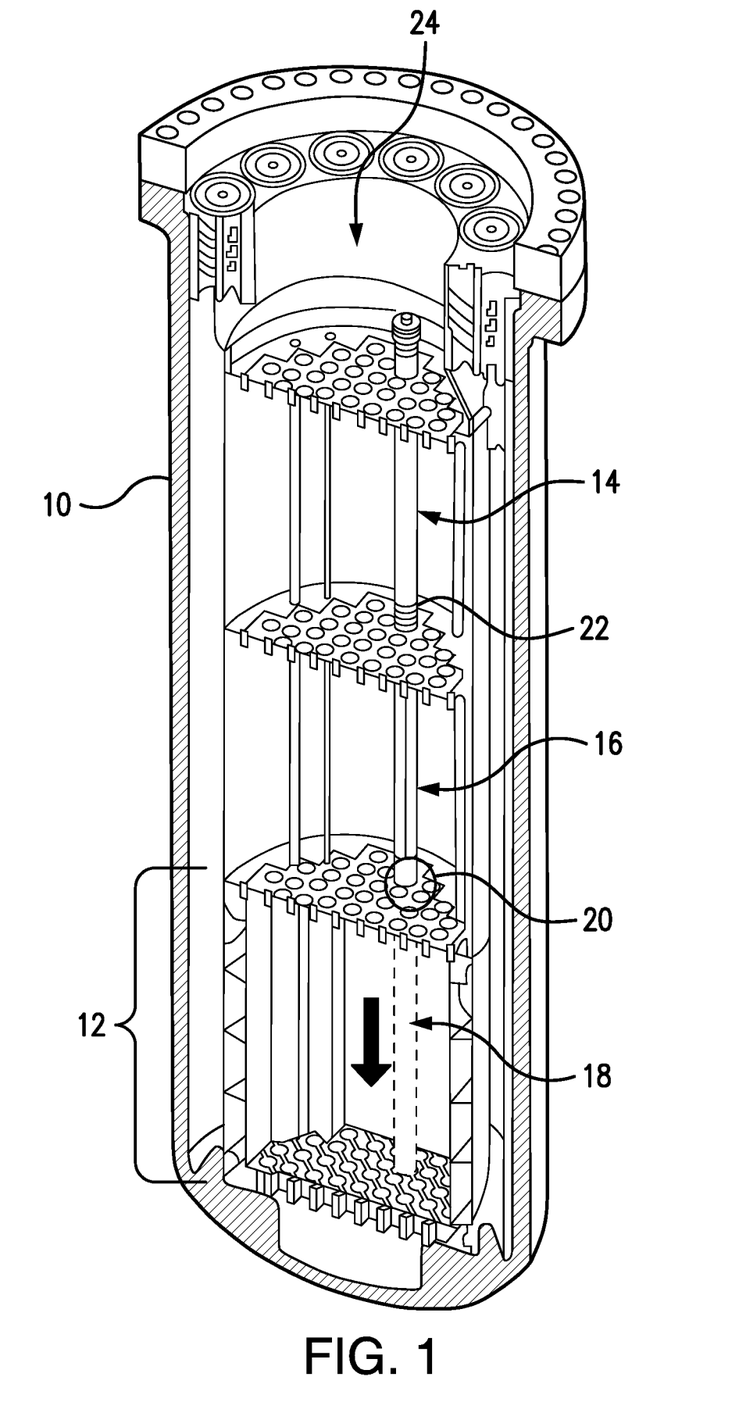
FIG. 1 is a partial perspective, cross-sectional view of a lower portion of a nuclear reactor pressure vessel including an illustrative control rod assembly.

With reference to FIG. 1, a relevant portion of an illustrative nuclear reactor pressure vessel 10 includes a reactor core 12 located proximate to a bottom of the pressure vessel 10. The core 12 includes or contains radioactive material such as, by way of illustrative example, enriched uranium oxide (that is, $UO_2$ processed to have an elevated $^{235}U/^{238}U$ ratio). A control rod drive mechanism (CRDM) 14 assembly is diagrammatically illustrated. The illustrative CRDM 14 is an internal CRDM that is disposed within the pressure vessel 10. In alternate embodiments, an external CRDM may be employed. Typically, there are multiple CRDM units each coupled with a plurality of control rods, although these additional CRDM units are not shown in FIG. 1. The pressure vessel 10 is drawn showing the space for such additional CRDM units.

Figure 3:
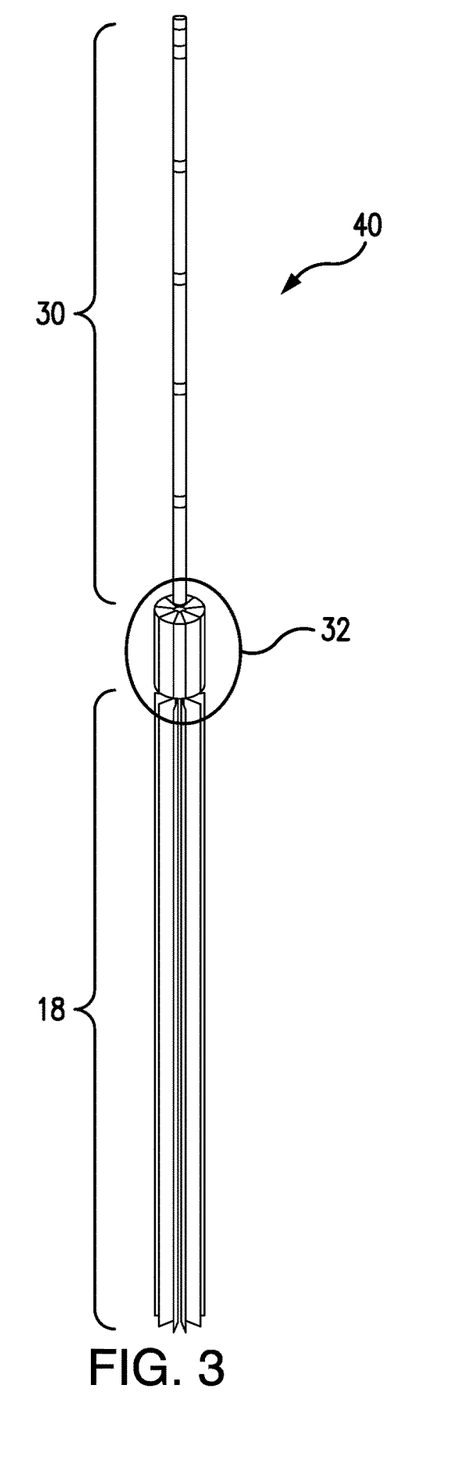
FIG. 3 is a perspective view of the control rods and the connecting rod of the control rod assembly shown in FIG. 2.

Below the CRDM 14 is a control rod guide frame 16, which in the perspective view of FIG. 1 blocks from view the control rod/CRDM coupling assembly (i.e., the spider 32 and connecting rod 30, both shown in FIG. 3). Extending below the guide frame 16 is a plurality of control rods 18. FIG. 1 shows the control rods 18 in their fully inserted position in which the control rods 18 are maximally inserted into the core 12. In the fully inserted position, the spider 32 (FIG. 3) is located at a lower location 20 within the control rod guide frame 16. In the illustrative embodiment of FIG. 1, the CRDM 14 and the control rod guide frame 16 are spaced apart by a standoff 22 comprising a hollow tube having opposite ends coupled with the CRDM 14 and the guide frame 16, respectively, and through which the connecting rod 30 (FIG. 3) passes.

Figure 2:
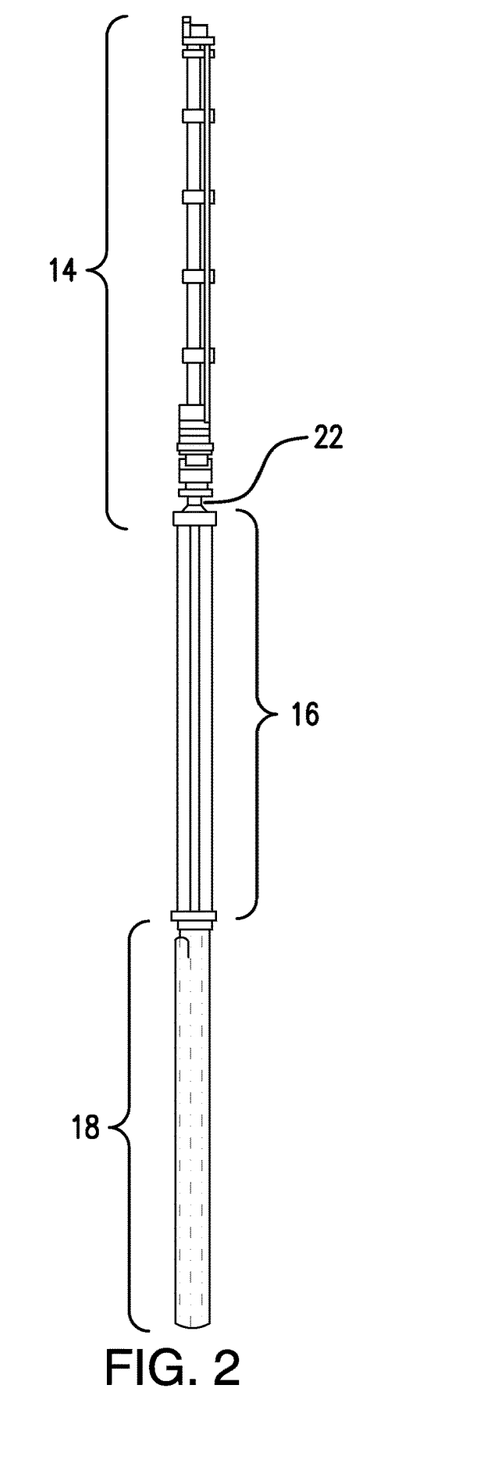
FIG. 2 is a side view of the control rod assembly shown in FIG. 1.

FIG. 1 shows only a lower portion of the illustrative pressure vessel 10. In an operating nuclear reactor, an open upper end 24 of the illustration is connected with one or more upper pressure vessel portions (not shown) that together with the illustrated lower portion of the pressure vessel 10 forms an enclosed pressure volume containing the reactor core 12, the control rods 18, the guide frame 16, and the internal CRDM 14. In an alternative embodiment, the CRDM 14 is external, located above the reactor pressure vessel. In such embodiments, the external CRDM is connected with the control rods 18 by a control rod/CRDM coupling assembly in which the connecting rod 30 extends through a portal in the upper portion of the pressure vessel. With reference to FIG. 2, the control assembly including the CRDM 14, the control rod guide frame 16, the intervening standoff 22, and the control rods 18 is illustrated isolated from the reactor pressure vessel. With reference to FIG. 3, the control rods 18 and the connecting rod 30 of the control rod assembly 40 are shown without any of the occluding components (e.g., without the guide frame, standoff, or CRDM). The spider 32 provides connection of the plurality of control rods 18 with the lower end of the corresponding connecting rod 30.

Figure 4A:
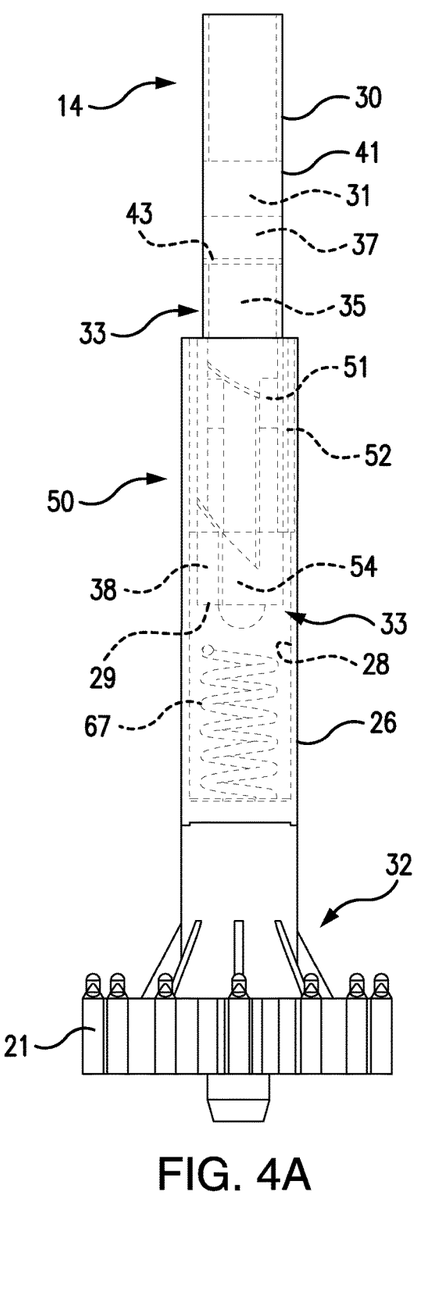
FIGS. 4A and 4B are a perspective view and a side view, respectively, of the bottom end of a control rod assembly including a disconnect mechanism in accordance with an embodiment of the present disclosure.
Figure 4B:
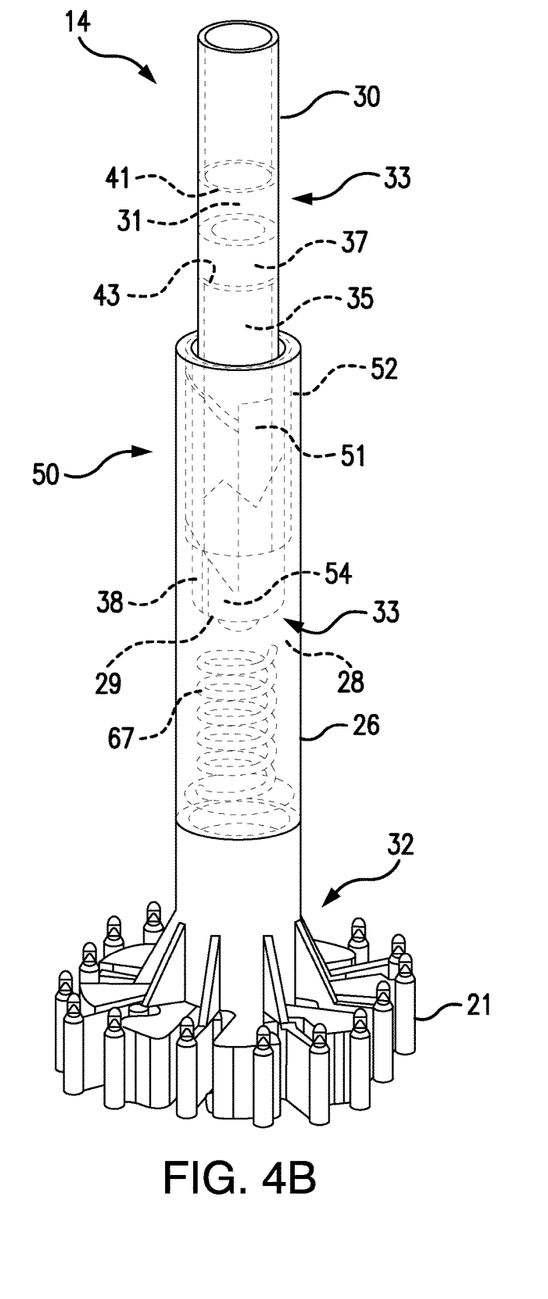

Referring now to FIGS. 4A and 4B, a disconnect mechanism 50 in accordance with the present disclosure is shown. The disconnect mechanism 50 includes a locking collar 52 that is non-rotatably secured within a central bore 28 of the spider 32 of the control rod drive mechanism 14. As shown, the spider 32 includes a mounting tube 26 that extends upwardly from a body portion 21 thereof and defines the central bore 28. The mounting tube 26 is configured to selectively receive the bottom end of the connecting rod 30 therein. As discussed in greater detail below, the locking collar 52 (FIGS. 6A through 6C) includes at least one locking recess 54 that is configured to selectively receive a cam 38 that is formed by a projection that extends radially-outwardly from a lock cam assembly 33 that is rotatably received in the bottom end 33 of the connecting rod 30 of the control rod assembly 40. Although embodiments of the disconnect mechanism 50 may include as few as one locking recess 54 and one corresponding cam 38, it is preferable that the disconnect mechanism 50 include at least a pair of opposed locking recesses 54 and a pair of corresponding opposed locking cams 38, as is shown in the present embodiment.

As is known in the art, friction forces between the lead screw (not shown) of a control rod assembly 40 and the roller nuts of a control rod drive mechanism 14 may cause the connecting rod 30 to rotate with respect to the torque tube (not shown) of the CRDM 14. As discussed in greater detail below, non-rotation of the connecting rod 30 is desirable as it maintains proper alignment of the connecting rod 30 with the locking collar 52. As shown, as is known in the art, in the present embodiment, rotation of the connecting rod 30 with respect to the torque tube is prevented by way of a key (not shown) which is non-rotatably fixed to the inner surface of the torque tube, and key slot (not shown) arrangement, the key slot being formed in an outer surface of the connecting rod 30, as is known.

Figure 5A:
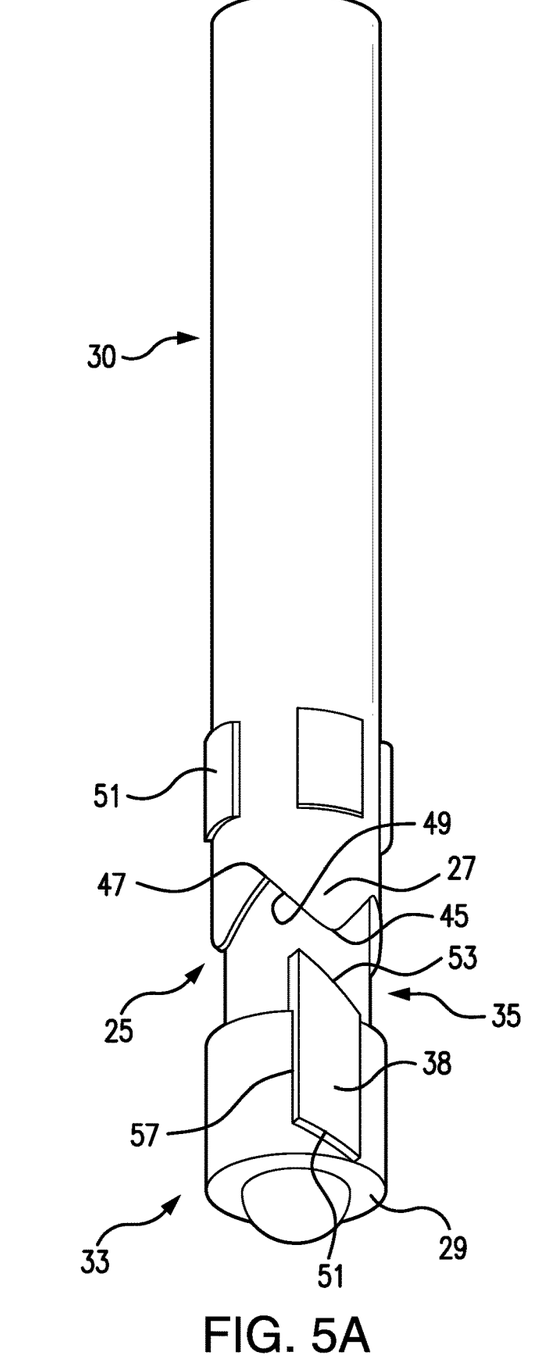
FIGS. 5A and 5B are a perspective view and a side view, respectively, of the bottom end of the connecting rod of the control rod assembly shown in FIGS. 4A and 4B.
Figure 5B:
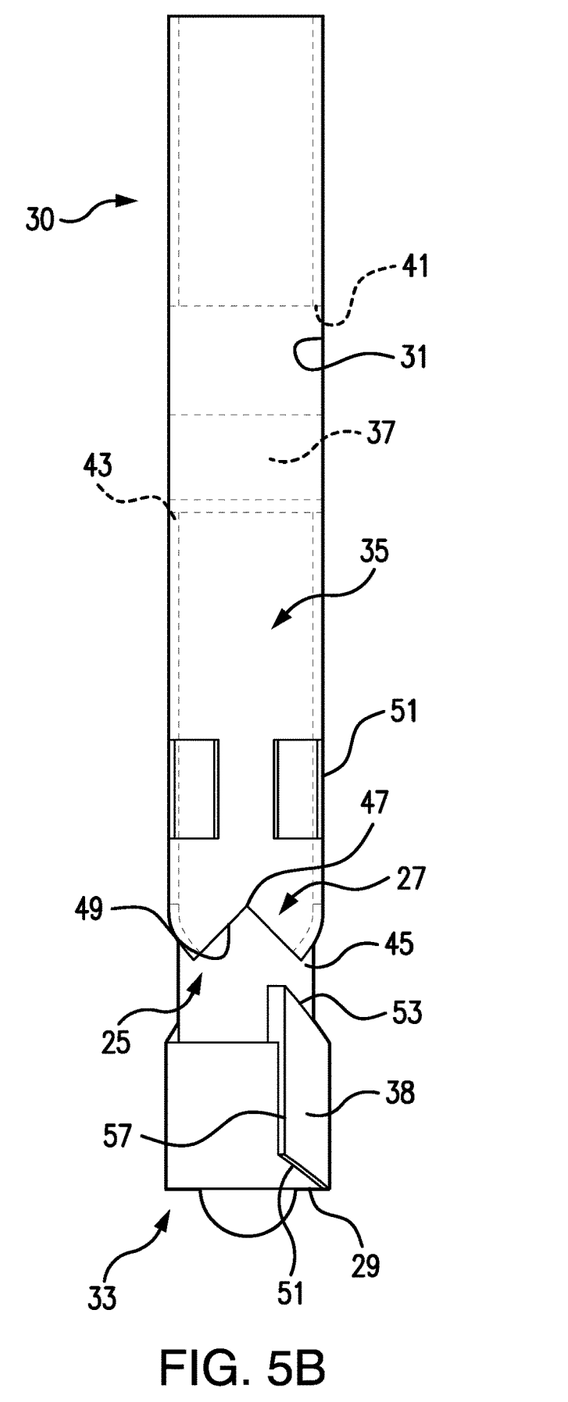

As best seen in FIGS. 5A and 5B, the bottom edge 27 of the connecting rod 30 includes a plurality of projections 25 formed by a series of alternating peaks 45 and valleys 47. The adjacent peaks 45 and valleys 47 are connected by a plurality of angled camming surfaces 49 that are configured to slidably engage the locking cams 38 of the lock cam assembly 33. Referring additionally to FIG. 4B, the bottom end of the connecting rod 30 also defines a cylindrical bore 31 that extends between an upper internal ledge 41 and a lower internal ledge 43. The cylindrical bore 31 is configured to slidably receive a portion of the body 35 of the lock cam assembly 33 therein so that the lock cam assembly 33 is limitedly slidable both into and out of the connecting rod 30. An outwardly-depending flange 37 on the top of the lock cam assembly 33 is slidably received between the upper and lower ledges 41 and 43, thereby limiting axial motion of the lock cam assembly 33 with respect to the connecting rod 30. An optional coil spring (not shown) may be disposed between the upper ledge 41 of the connecting rod 30 and the top flange 37 of the lock cam assembly 33. The coil spring may be used to reduce vibration of the lock cam assembly 33 during normal reactor operations by urging the assembly downwardly until the top flange 37 of the assembly abuts the lower ledge 43 of the connecting rod 30.

Figure 6A:
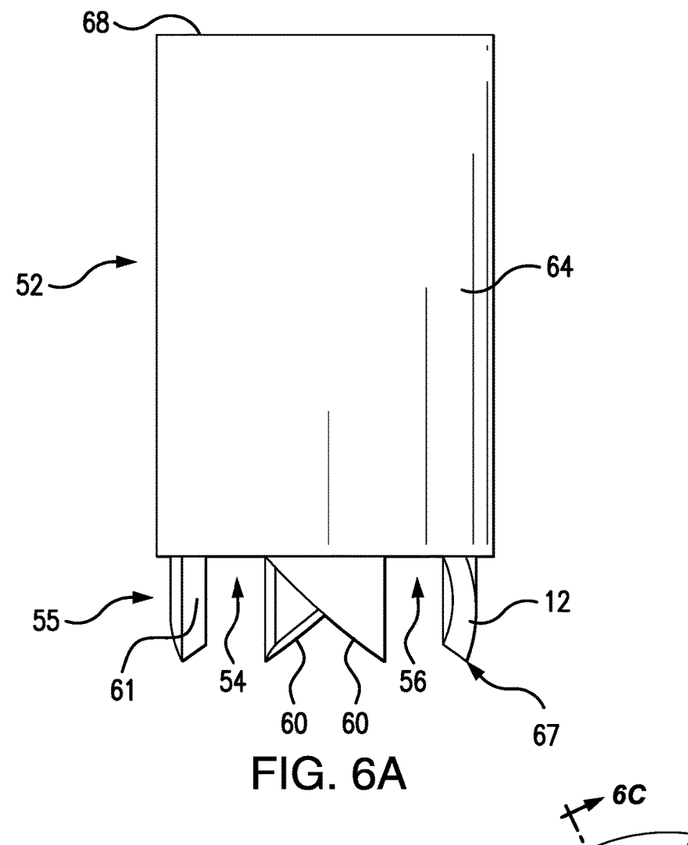
FIGS. 6A through 6C are side, bottom, and cross-sectional views of the locking collar of the disconnect mechanism of the control rod assembly shown in FIGS. 4A and 4B.
Figure 6B:
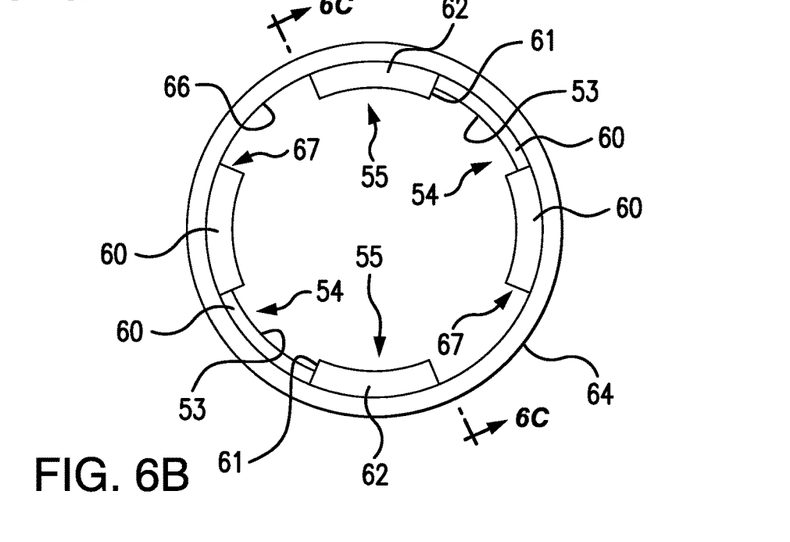
Figure 6C:
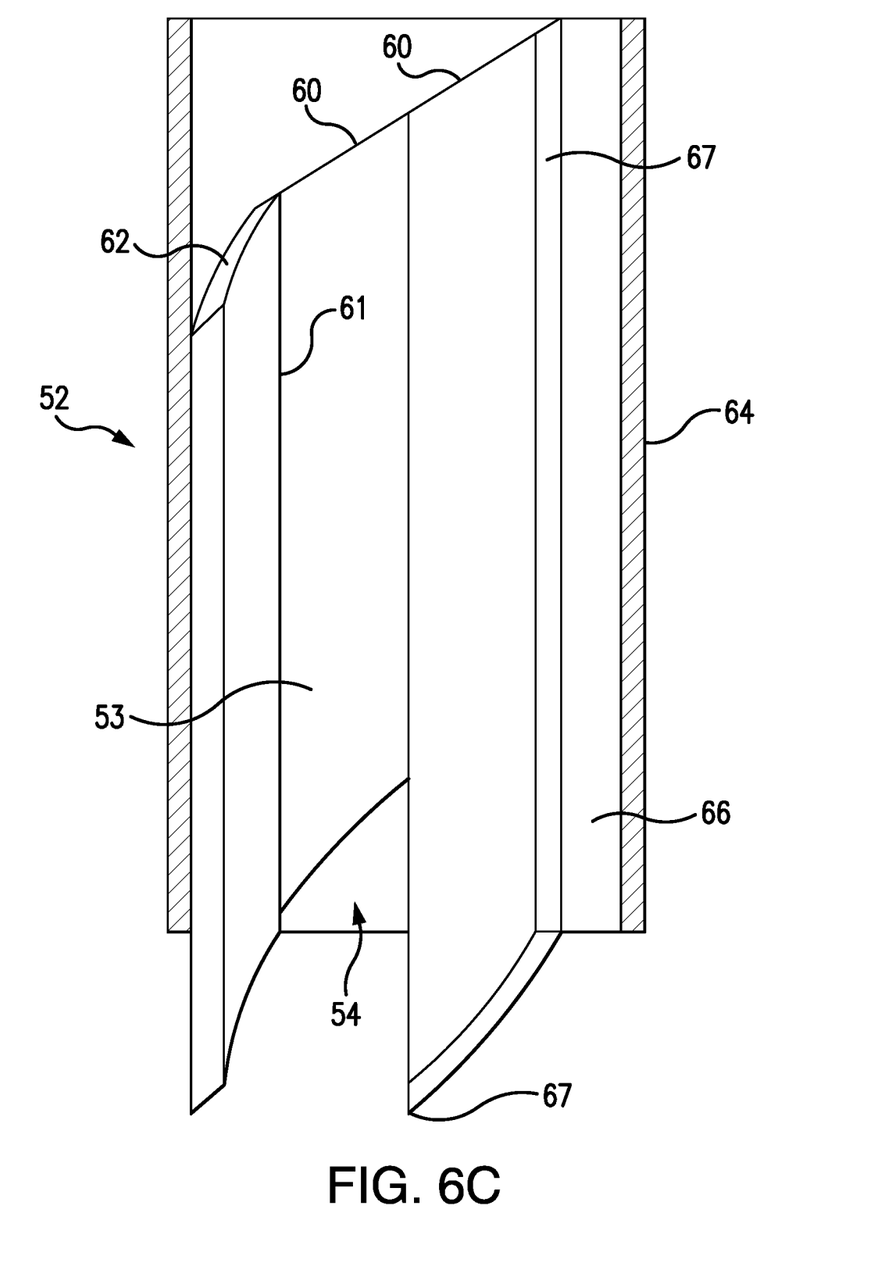

As shown in FIGS. 6A through 6C, the locking collar 52 is formed by concentric outer and inner surfaces 64 and 66, respectively. The embodiment shown includes two locking recesses 54, each locking recess 54 being defined by a projection 55 that extends radially-inwardly from the inner surface 66 of the locking collar 52. Each locking recess 54 includes a first angled camming surface 60, a stop surface 61, and a second angled camming surface 62. As best seen in FIGS. 6C, the first camming surface 60 extends upwardly from a bottommost edge 67 of the locking collar 52 to a top end of the stop surface 61, which extends upwardly from the top of the stop surface 61 and is parallel to a longitudinal center axis of the locking collar 52. The second camming surface 62 also slopes upwardly from the bottommost edge 67 of the locking collar 52 until intersecting a corresponding one of the entry slots 56. A pair of entry slots 56 separate the projections 55, with each entry slot 56 extending downwardly from a top edge 68 of the locking collar 52 and being configured to slidably receive a corresponding locking cam 38 therein. Preferably, the top end of each entry slot 56 is flared to facilitate slidably receiving both a corresponding locking cam 38 and key 51 of the lock cam assembly 33. Note, interaction of the keys 51 of the connecting rod 30 with the entry slots 56 and pass-through slots 53 of the locking collar 52 further prevents rotation of the connecting rod 30 with respect to the locking collar 52. The locking collar 52 is non-rotatably fixed at the top end of the spider 32, as shown in FIGS. 4A and 4B.

Referring again to FIGS. 5A and 5B, the lock cam assembly 33 of the present embodiment preferably includes a pair of opposed cam projections 38, one for each locking recess 54. As shown, each locking cam 38 includes an angled bottom surface 51, an angled camming surface 53, and a stop surface 57 that extends upwardly from the bottom surface 51 to the camming surface 53 and is parallel to the longitudinal center axis of the lock cam assembly 33. As shown, the slope of the angled camming surface 53 of each cam 38 is the same as the slopes of the first camming surfaces 60 and second camming surfaces 62 of the lock recesses 54, as well as the camming surfaces 49 of the bottom edge 27 of the connecting rod 30.

Figure 7A:
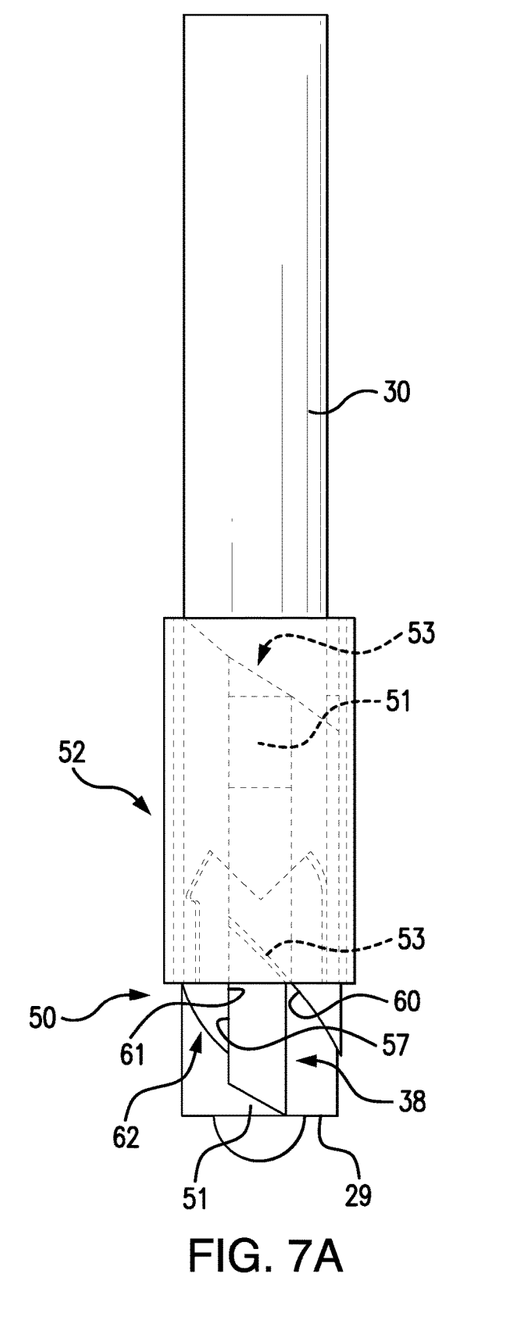
FIGS. 7A and 7B are partial side views of the disconnect mechanism of the control rod assembly shown in FIGS. 4A and 4B, in the engaged and disengaged states, respectively.

Referring to FIGS. 4A, 4B, 7A, and 7B, the operation of the disconnect mechanism 50 is now discussed. As shown in FIG. 7A, during extended shutdown periods for the reactor, the locking cams 38 of the lock cam assembly 33 are aligned with the entry slots 56 of the locking collar 52 so that motion of the connecting rod 30 does not alter the position of the spider 32 and, therefore, control rods 18 (FIG. 3). As such, the locking cams 38 of the lock cam assembly 33 may be disposed above the locking collar 52 so that the locking collar 52 is not engaged with the connecting rod 30 of the control rod assembly 40. As previously noted, the connecting rod 30 is non-rotatably fixed to the torque tube 26.

Figure 7B:
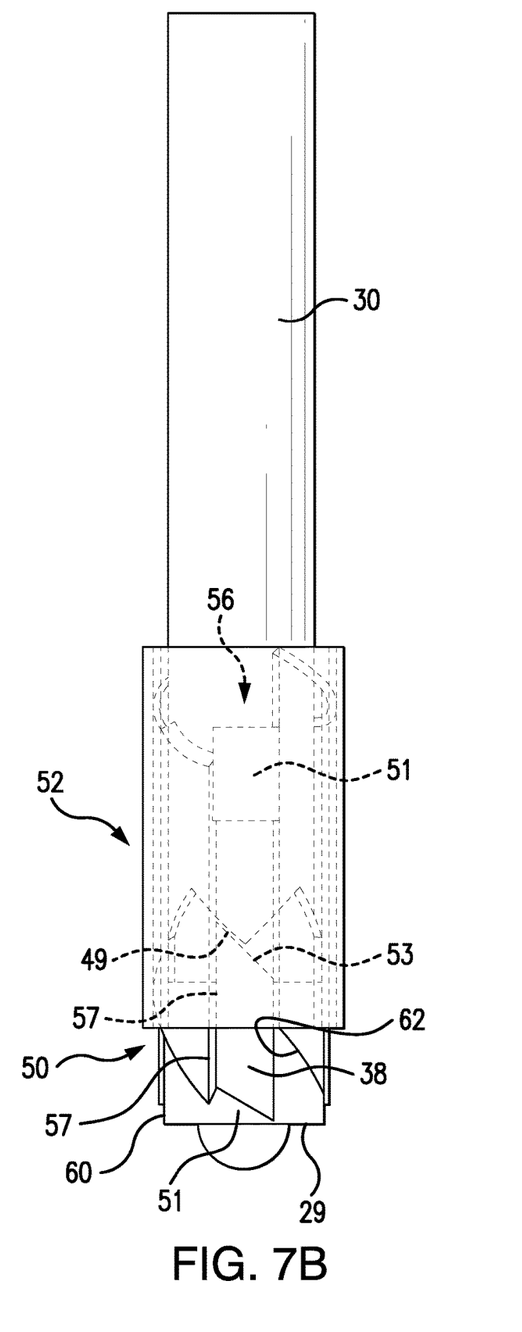

When an operator desires to engage the spider 32 of the control rod assembly 40 with the connecting rod 30, the control rod drive mechanism 14 is utilized to move the connecting rod 30 downwardly within the torque tube 26. As shown in FIG. 7B, the top end of each entry slot 56 is flared to facilitate entry of the corresponding locking cam 38, which includes the angled bottom end 51 to facilitate entry into the slot 56. When the locking cams 38 are not engaged with the locking collar 52, the coil spring 67 of the spider 32 is fully extended. Continued downward motion of the connecting rod 30 causes the end face 29 of the lock cam assembly 33 to come into contact with the spring 67, at which point the lock cam assembly 33 moves upwardly with respect to the connecting rod 30 until the flange 37 comes into contact with the upper ledge 41 of the bore 31. At this point, the coil spring 67 begins to become compressed.

Continued downward movement of the connecting rod 30 with respect to the torque tube 26 causes the locking cams 38 to exit the bottom ends of the entry slots 56, thereby clearing the bottom most edges 67 of the projections 55, at which point the lock cam assembly 33 is free to rotate with respect to the torque tube 26 and, therefore, the locking collar 52. Referring additionally to FIG. 7A, once the top of the stop surface 57 of each locking cam 38 clears the bottom end of the corresponding entry slot 56, upward force exerted by the coil spring 67 on the lock cam assembly 33 forces the lock cam assembly 33 to move upwardly with respect to both the connecting rod 30 and locking collar 52. As shown, interaction of the camming surface 49 of the bottom edge 27 of the connecting rod 30 causes the cam lock assembly 33 to rotate in the clockwise direction when viewing the connecting rod 30 from above. As well, the lock cam assembly 33 rotates with respect to the locking collar 52 and connecting rod 30 as the camming surfaces 53 of the locking cams 38 slide upwardly along the first camming surfaces 60 of the locking recesses 54. Upward motion and clockwise rotation of the lock cam assembly 33 continues until the stop surface 57 of each cam 38 comes into abutment with the lock surface 61 of the corresponding locking recess 54. At this point, the locking cams 38 are firmly seated within the locking recesses 54 of the locking collar 52 so that the corresponding control rod assembly 40 (FIG. 3) is fully supported by the locking collar 52, and the control rods 18 may be manipulated as desired with the CRDM 14.

To disconnect the connecting rod 30 and, therefore, the CRDM 14, from the spider 32, the control rod drive mechanism 14 is energized and a lead screw of the control rod assembly 40 (FIG. 3) is engaged to move the connecting rod 30 in the downward direction. Eventually, a camming surface 49 of the bottom edge 27 of the connecting rod 30 comes into contact with the camming surface 53 of a corresponding locking cam 38. Continued downward motion of the connecting rod 30 once again causes the end face 29 of the lock cam assembly 33 to come into contact with the coil spring 67, thereby causing it to be compressed. Once the bottom end of the stop surface 57 of each locking cam 38 clears the bottommost end of the lock surface 61 of each locking recess 54, the lock cam assembly 33 is once again free to rotate in the clockwise direction with respect to both the locking collar 52 and the connecting rod 30. As best seen in FIG. 7B, the upward force exerted by the coil spring 67 and interaction of camming surfaces 49 of the connecting rod 30 causes the camming surfaces 53 of the locking cams 38 to slide upwardly along the second camming surfaces 62 of the locking recesses 54 until each locking cam 38 enters the corresponding entry slot 56. As shown in FIG. 7B, the connecting rod 30 is now free to move upwardly independently of the control rods 18 so that they may remain fully inserted in the reactor.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

The invention claimed is:

1. A control rod drive mechanism comprising:
a torque tube with an inner surface defining a central bore;
a control rod assembly including a connecting rod disposed within the central bore of the torque tube and a spider, the connecting rod being releasably securable to the spider;
a lock cam assembly rotatably secured to a bottom end of the connecting rod, the lock cam assembly including a body portion and at least one locking cam extending radially-outwardly therefrom; and
a locking collar disposed non-rotatably within the spider, the locking collar including an inner surface defining a central bore and at least one locking recess therein, the locking recess including an entry slot extending downwardly from a top edge of the locking collar;
wherein the connecting rod is axially-movable with respect to the torque tube between a first position in which the lock cam assembly is rotatable with respect to the torque tube, and a second position in which the lock cam assembly is non-rotatable with respect to the torque tube.

2. The control rod drive mechanism of claim 1, wherein when the at least one locking cam is disposed in the entry slot of the at least one locking recess, the lock cam assembly is non-rotatable with respect to the locking collar and axially movable with respect to the locking collar.

3. The control rod drive mechanism of claim 1, wherein when the connecting rod is in the first position the lock cam assembly is above the locking collar, and in the second position the at least one cam is disposed within the locking recess.

4. The control rod drive mechanism of claim 3, wherein the at least one locking recess further comprises a first camming surface, a second camming surface, and a lock surface extending therebetween.

5. The control rod drive mechanism of claim 4, wherein the first camming surface and the second camming surface are of the same slope with respect to the longitudinal center axis of the locking collar.

6. The control rod drive mechanism of claim 5, wherein the at least one locking cam includes a vertical lock surface and an angled camming surface that has the same slope as the first and the second camming surfaces of the at least one locking recess.

7. The control rod drive mechanism of claim 5, wherein the lock surface lies in a vertical plane that includes the longitudinal center axis of the locking collar.

8. The control rod drive mechanism of claim 1, wherein:
the at least one cam of the lock cam assembly includes two cams,
the at least one locking recess of the locking collar includes two locking recesses.

9. The control rod drive mechanism of claim 1, wherein the connecting rod includes a bottom end defining a cylindrical bore, and the body portion of the lock cam assembly is rotatably disposed within the cylindrical bore.

* * * * *